United States Patent
Sandell

(10) Patent No.: US 11,722,889 B2
(45) Date of Patent: Aug. 8, 2023

(54) SECRET KEY GENERATION USING A RELAY WITH PRECODING IN THE NULL SPACE

(71) Applicant: Kabushiki Kaisha Toshiba, Tokyo (JP)

(72) Inventor: Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/316,879

(22) Filed: May 11, 2021

(65) Prior Publication Data

US 2022/0386116 A1 Dec. 1, 2022

(51) Int. Cl.
*H04W 12/041* (2021.01)
*H04W 12/0431* (2021.01)
(Continued)

(52) U.S. Cl.
CPC ....... *H04W 12/041* (2021.01); *H04L 27/2636* (2013.01); *H04W 12/0431* (2021.01); *H04W 12/06* (2013.01)

(58) Field of Classification Search
CPC ........... H04W 12/041; H04W 12/0431; H04W 12/06; H04L 27/2636; H04L 9/0875
See application file for complete search history.

(56) References Cited

U.S. PATENT DOCUMENTS

2018/0115420 A1* 4/2018 Ludwig ............... H04L 9/0875
2019/0288892 A1* 9/2019 Son .................... H04W 74/0833

FOREIGN PATENT DOCUMENTS

| JP | 2006-042174 A | 2/2006 |
| WO | WO 2015/023233 A1 | 2/2015 |

OTHER PUBLICATIONS

U.S. Appl. No. 16/951,467, filed Nov. 18, 2020, Sandell.
(Continued)

*Primary Examiner* — David S Huang
(74) *Attorney, Agent, or Firm* — Oblon, McClelland, Maier & Neustadt, L.L.P.

(57) ABSTRACT

A method comprising transmitting, by a first communication node (101), a first communication; receiving, by a relay node (103; 503), the first communication and estimating a first communication channel ($H_k$; $H_k^{(1)}$). Transmitting, by a second communication node (102), a second communication; receiving, by the relay node (103; 503), the second communication; and estimating a second communication channel ($G_k$; $G_k^{(1)}$); generating a first transmission signal ($x_k$; $x_1$); transmitting, by the relay node (103; 503), the first transmission signal ($x_k$; $x_1$); generating, by the first communication node (101), a first instance of the encryption key ($\kappa_A$) based on a first received signal ($r_A$); generating, by the second communication node (102), a second instance of the encryption key ($\kappa_B$) based on a second received signal ($r_B$), wherein: the transmission signal ($x_k$) is generated such that the first received signal ($r_A$) is equal to the second received signal ($r_B$).

20 Claims, 8 Drawing Sheets

(51) Int. Cl.
H04W 12/06 (2021.01)
H04L 27/26 (2006.01)

(56) References Cited

OTHER PUBLICATIONS

Wang et al., "Survey on channel reciprocity based key establishment techniques for wireless systems", Wireless Networks, Aug. 2015, 13 pages, doi 10.1007/s11276-014-0841-8.
Aldaghri et al., "Physical Layer Secret Key Generation in Static Environments", IEEE Transactions on Information Forensics and Security, vol. 15, 2020, pp. 2692-2705, doi: 10.1109/TIFS.2020.2974621.
El Hajj Shehadeh et al., "On Improving the Robustness of Physical-layer Key Extraction Mechanisms against Delay and Mobility", 2012 $8^{th}$ International Wireless Communicationsand Mobile Computing Conference (IWCMC), 2012, pp. 1028-1033, doi: 10.1109/IWCMC.2012.6314347.
Zhang et al., "Efficient Key Generation by Exploiting Randomness From Channel Responses of Individual OFDM Subcarriers", IEEE Transactions on Communications, vol. 64, No. 6, Jun. 2016, pp. 2578-2588, doi: 10.1109/TCOMM.2016.2552165.
Hong et al., "Vector Quantization and Clustered Key Mapping for Channel-Based Secret Key Generation", IEEE Transactions on Information Forensics and Security, vol. 12, No. 5, May 2017, pp. 1170-1181, doiL 10.1109/TIFS.2017.2656459.

\* cited by examiner

SECRET KEY GENERATION USING A RELAY WITH PRECODING IN THE NULL SPACE

FIELD

Embodiments described herein relate generally to a method and system for generating an encryption key, and communication apparatuses for use in such systems.

BACKGROUND

Encryption is a process in which data is encoded in such a way that the data can only be read by authorised parties. Two known types of encryption are asymmetric-key encryption and symmetric key encryption. Asymmetric-key encryption uses a key pair comprising a public key (which is known to others) and a private key (which is only known to the user). In asymmetric-key encryption a party encodes a message with the user's public key, thereby generating an encrypted message. This encrypted message can only be decrypted with the user's private key, thereby obtaining secure communications. In symmetric-key encryption the same cryptographic key is used for encrypting and decrypting data. In this way the cryptographic key known by the two parties in a symmetric-key encryption system represents a shared secret piece of information. Symmetric-key encryption is preferred in some situations (e.g. in Internet of Things networks) due to its low-complexity implementation compared to Asymmetric-key encryption which requires complex mathematical operations to generate the key pair.

Symmetric-key encryption relies on a cryptographic key being shared (i.e. distributed) between the two communicating devices. Sharing the cryptographic key over a wireless network in a secure manner can be challenging since eavesdroppers could intercept the cryptographic key and de-encrypt all subsequent communications.

A known technique to generate and distribute cryptographic keys for secure communication that avoids this problem is to exploit the randomness of the wireless channel. Since the wireless channel between two legitimate users is different to the wireless channel between either of the users and an eavesdropper, it is possible to generate cryptographic keys using the wireless channel that are unique and unobtainable to an eavesdropper. Furthermore exploiting the randomness of the wireless channel to generate secret keys has the advantage that cryptographic keys are generated using a low-complexity technique that makes use of the randomness of the intended communication link, as opposed to solving computationally difficult problems.

If the two devices are not within communicative range of each other, a relay must be used as an intermediary to relay messages between the two devices. An example of this is a mesh network topology. In this case the properties of the wireless communication channels between the nodes and the relay station can be used to generate the secret cryptographic keys. A known approach to symmetric-key generation uses an amplify-and-forward (AF) scheme where a relay node estimates the wireless channel between a first device (named 'Alice') and the relay node, and subsequently forward this information to the second device (named 'Bob'). Likewise the relay node also estimates the wireless channel between 'Bob' and the relay node, and subsequently forwards this information to 'Alice'. Although this approach allows both 'Alice' and 'Bob' to have the same estimated communication channels to generate a shared secret key from, the performance may be sub-optimum. Furthermore, in this scheme the relay node needs two time slots to transmit signals to 'Alice' and 'Bob' separately.

As a result, there is a need for an improved method of secret key generation in a wireless network that uses a relay device.

Arrangements of embodiments will be understood and appreciated more fully from the following detailed description, made by way of example only and taken in conjunction with drawings in which.

DETAILED DESCRIPTION

Figure 1:
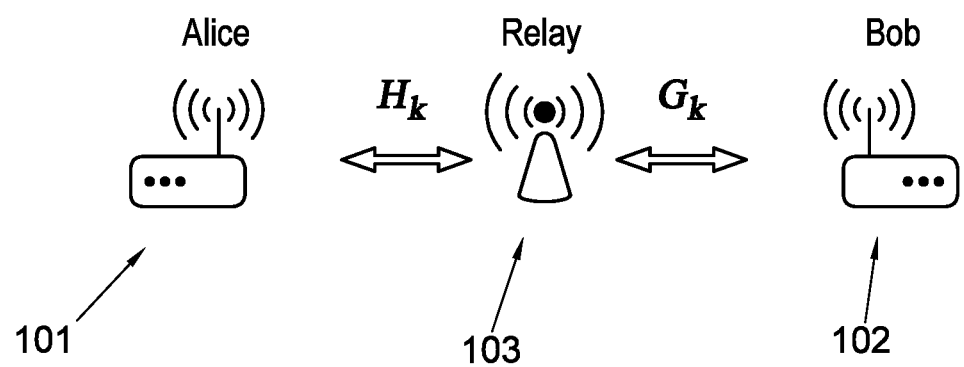
FIG. 1 shows a wireless network according to an embodiment.

According to a first aspect there is provided a method for generating an encryption key in a system comprising a first communication node (101), a second communication node (102) and a relay node (103; 503) wherein the relay node (103; 503) comprises a first antenna. The method comprising: transmitting, by the first communication node (101), a first communication via a first communication channel ($H_k$; $H_k^{(1)}$), wherein: the first communication channel ($H_k$; $H_k^{(1)}$) is between the first communication node (101) and the first antenna of the relay node (103; 503); and the first communication comprises a first training packet. The method further comprising receiving, by the relay node (103; 503), the first communication; and in response to receiving the first communication, estimating the first communication channel ($H_k$; $H_k^{(1)}$); transmitting, by the second communication node (102), a second communication via a second communication channel ($G_k$; $G_k^{(1)}$) wherein: the second communication channel ($G_k$; $G_k^{(1)}$) is between the second communication node (102) and the first antenna of the relay node (103; 503); and the second communication comprises a second training packet. The method further comprising: receiving, by the relay node (103; 503), the second communication; and in response to receiving the second communication: estimating the second communication channel ($G_k$; $G_k^{(1)}$); generating, by the relay node (103; 503), a first transmission signal ($x_k$; $x_1$); transmitting, by the relay node (103; 503), the first transmission signal ($x_k$; $x_1$) via the first communication channel ($H_k$; $H_k^{(1)}$) and the second communication channel ($G_k$, $G_k^{(1)}$); determining, by the first communication node (101), a first received signal ($r_A$); determining, by the second communication node (102), a second received signal ($r_B$); generating, by the first communication node (101), a first instance of the encryption key ($\kappa_A$) based on the first received signal ($r_A$); and generating, by the second communication node (102), a second instance of the encryption key ($\kappa_B$) based on the second received signal ($r_B$), wherein: the transmission signal ($x_k$) is generated such that the first received signal ($r_A$) is equal to the second received signal ($r_B$).

In an embodiment the first communication channel has different properties to the second communication channel.

In an embodiment, the first communication channel and the second communication channel are wireless communication channels.

In an embodiment, generating the first instance of the encryption key ($\kappa_A$) further comprises quantising the first received signal ($r_A$); and generating the second instance of the encryption key ($\kappa_B$) further comprises quantising the second received signal ($r_B$).

In an embodiment the method further comprises: calculating, by the relay node (103; 503), a null space (V) of a difference between the first communication channel ($H_k$) and the second communication channel ($G_k$); and generating the first transmission signal ($x_k$; $x_1$) based on the null space (V).

In an embodiment the method further comprises: selecting, by the relay node (103), a codeword (q) from a codebook; and generating the first transmission signal ($x_k$, $x_1$) further comprises: determining an arbitrary vector (y); and generating the first transmission signal ($x_k$, $x_1$) based on the null space (V) and the arbitrary vector (y); wherein: the arbitrary vector (y) is determined such that the first received signal ($r_A$) and the second received signal ($r_B$) equals the codeword (q).

In an embodiment the codebook is a quantiser codebook.

In an embodiment the codeword (q) is randomly selected from the quantiser codebook.

In an embodiment the arbitrary vector (y) is calculated according to: the pseudoinverse of the first communication channel ($H_k$) multiplied by the null space (V), multiplied by the codeword (q).

In an embodiment the first communication comprises a first training sequence that has been scrambled by a first scrambling sequence ($A_k$); the second communication comprises a second training sequence that has been scrambled by a second scrambling sequence ($B_k$); and the method further comprises: scrambling, by the first communication node (101), the first received signal ($r_A$) with the first scrambling sequence ($A_k$) to generate a scrambled first received signal; quantising, by the first communication node (101), the scrambled first received signal to generate the first instance of the encryption key ($\kappa_A$); scrambling, by the second communication node (102), the second received signal ($r_B$) with the second scrambling sequence ($B_k$) to generate a scrambled second received signal; and quantising, by the second communication node (102), the scrambled second received signal to generate the second instance of the encryption key ($\kappa_B$).

In an embodiment the first transmission signal ($x_k$; $x_1$) is an Orthogonal Frequency Division Multiplexing signal comprising a plurality of subcarriers, wherein the plurality of subcarriers comprises a plurality of sets of subcarriers, wherein each set of subcarriers has an equal number of subcarriers and subcarriers in a set convey a same data value.

In an embodiment the method further comprises: transmitting, by the first communication node (101), the first communication via a third communication channel ($F_k$); transmitting, by the second communication node (102), the second communication via the third communication channel ($F_k$); determining, by the second communication node (102), a third received signal in response to the first communication node (101) transmitting the first communication via the third communication channel ($F_k$). The method further comprises determining, by the first communication node (101), a fourth received signal in response to the second communication node (102) transmitting the second communication via the third communication channel ($F_k$); and wherein: generating, by the first communication node (101), the first instance of the encryption key is further based on the fourth received signal; and generating, by the second communication node (102), the second instance of the encryption key is further based on the third received signal.

In an embodiment the first communication is communicated via the first path and the third path at the same time; originates from same transmission; single transmission.

In an embodiment the method further comprises: quantising, by the first communication node (101): the first received signal ($r_A$) to form a first quantised received signal; and the fourth received signal to form a fourth quantised received signal. The method further comprises quantising, by second communication node (102): the second received signal ($r_B$) to form a second quantised received signal; and the third received signal to form a third quantised received signal. And wherein: generating the first instance of the encryption key ($\kappa_A$) further comprises a modulo-2 addition of the first quantised received signal and the fourth quantised received signal; and generating the second instance of the encryption key ($r_B$) further comprises a modulo-2 addition of the second quantised received signal and the third quantised received signal.

In an embodiment the method further comprises: concatenating, by the first communication node (101), the first received signal ($r_A$) and the fourth received signal to form a first concatenated signal; concatenating, by the second communication node (102), the second received signal ($r_B$) and the third received signal to form a second concatenated signal; quantising, by the first communication node (101), the first concatenated signal to form a first quantised concatenated signal; quantising, by the second communication node (102), the second concatenated signal to form a second quantised concatenated signal; generating, by the first communication node (101), the first instance of the encryption key ($\kappa_A$) based on the first quantised concatenated signal; and generating, by the second communication node (102), the second instance of the encryption key ($\kappa_B$) based on the second quantised concatenated signal.

In an embodiment the relay node (503) comprises a second antenna, and the method further comprises: transmitting, by the first communication node (101), the first communication via a third communication channel ($H_k^{(2)}$) between the first communication node (101) and the second antenna of the relay node (503); receiving, by the relay node (103), the first communication; and in response to receiving the first communication: estimating the third communication channel ($H_k^{(2)}$); transmitting, by the second communication node (102), the second communication via a fourth communication channel ($G_k^{(2)}$) between the second communication node (102) and the second antenna of the relay node; receiving, by the relay node (103), the second communication; and in response to receiving the second communication: estimating a fourth communication channel ($G_k^{(2)}$); generating a second transmission signal ($x_2$); and transmitting the second transmission signal ($x_1$) via the third communication channel ($H_k^{(2)}$) and the fourth communication channel ($G_k^{(2)}$); wherein: the second transmission signal ($x_2$) is generated such that the combination of the first transmission signal ($x_1$) transmitted via the first communication path ($H_k^{(1)}$) and the second transmission signal ($x_2$) transmitted via the third communication path ($H_k^{(2)}$) equals the combination of the first transmission signal ($x_1$) transmitted via the second communication path ($G_k^{(1)}$) and the second transmission signal ($x_2$) transmitted via the fourth communication path ($G_k$>).

According to a second aspect there is provided a system for generating an encryption key, the system comprising a first communication node (101), a second communication node (102) and a relay node (103; 503) wherein the relay node (103; 503) comprises a first antenna, wherein: the first communication node (101) is configured to: transmit a first communication via a first communication channel ($H_k$; $H_k^{(1)}$), wherein: the first communication channel ($H_k$; $H_k^{(1)}$) is between the first communication node (101) and the first antenna of the relay node (103; 503); and the first communication comprises a first training packet; determine a first received signal ($r_A$); and generate a first instance of the encryption key ($\kappa_A$) based on the first received signal ($r_A$). The second communication node (102) is configured to: transmit a second communication via a second communication channel ($G_k$; $G_k^{(1)}$) wherein: the second communication channel ($G_k$; $G_k^{(1)}$) is between the second communication node (102) and the first antenna of the relay node (103; 503); and the second communication comprises a second training packet; determine a second received signal ($r_B$); generate a second instance of the encryption key ($\kappa_B$) based on the second received signal ($r_B$). And the relay node (103; 503) is configured to: receive the first communication; and in response to receiving the first communication, estimate the first communication channel ($H_k$; $H_k^{(1)}$); receive the second communication; and in response to receiving the second communication: estimate the second communication channel ($G_k$, $G_k^{(1)}$); generate a first transmission signal ($x_k$; $x_1$); and transmit the first transmission signal ($x_k$; $x_1$) via the first communication channel ($H_k$,$H_k^{(1)}$) and the second communication channel ($G_k$,$G_k^{(1)}$); wherein: the transmission signal ($x_k$) is generated such that the first received signal ($r_A$) is equal to the second received signal ($r_B$).

In an embodiment the relay node (103; 503) is further configured to calculate, a null space (V) of a difference between the first communication channel ($H_k$) and the second communication channel ($G_k$); and generate the first transmission signal ($x_k$; $x_1$) based on the null space (V).

In an embodiment the relay node (103; 503) is further configured to: select a codeword (q) from a codebook; determine an arbitrary vector (y); and generate the first transmission signal ($x_k$, $x_1$) based on the null space (V) and the arbitrary vector (y); wherein: the arbitrary vector (y) is determined such that the first received signal ($r_A$) and the second received signal ($r_B$) equals the codeword (q).

In an embodiment the first communication comprises a first training sequence that has been scrambled by a first scrambling sequence ($A_k$), the second communication comprises a second training sequence that has been scrambled by a second scrambling sequence ($B_k$) and the first communication node (101) is further configured to: scramble the first received signal ($r_A$) with the first scrambling sequence ($A_k$) to generate a scrambled first received signal; and quantise the scrambled first received signal to generate the first instance of the encryption key ($\kappa_A$). And the second communication node (102) is further configured to: scramble the second received signal ($r_B$) with the second scrambling sequence ($B_k$) to generate a scrambled second received signal; quantise the scrambled second received signal to generate the second instance of the encryption key ($\kappa_B$).

In an embodiment the first transmission signal ($x_k$; $x_1$) is an Orthogonal Frequency Division Multiplexing signal comprising a plurality of subcarriers, wherein the plurality of subcarriers comprises a plurality of sets of subcarriers, wherein each set of subcarriers has an equal number of subcarriers and subcarriers in a set convey a same data value.

In an embodiment the first communication node (101) is further configured to: transmit the first communication via a third communication channel ($F_k$); determine a fourth received signal in response to the second communication node (102) transmitting the second communication via the third communication channel ($F_k$); generate the first instance of the encryption key based on the fourth received signal and the first received signal ($r_A$). And the second communication node (102) is further configured to: transmit the second communication via the third communication channel ($F_k$); determine a third received signal in response to the first communication node (101) transmitting the first communication via the third communication channel ($F_k$); and generate the second instance of the encryption key based on the third received signal and the second received signal ($r_B$).

In an embodiment the first communication node (101) is further configured to: quantise the first received signal ($r_A$) to form a first quantised received signal; quantise the fourth received signal to form a fourth quantised received signal; and generate the first instance of the encryption key ($\kappa_A$) according to a modulo-2 addition of the first quantised received signal and the fourth quantised received signal. And the second communication node (102) is further configured to: quantise the second received signal ($r_B$) to form a second quantised received signal; quantise the third received signal to form a third quantised received signal; and generate the second instance of the encryption key ($r_B$) according to a modulo-2 addition of the second quantised received signal and the third quantised received signal.

In an embodiment the first communication node (101) is further configured to: concatenate the first received signal ($r_A$) and the fourth received signal to form a first concatenated signal; quantise the first concatenated signal to form a first quantised concatenated signal; and generate the first instance of the encryption key ($\kappa_A$) based on the first quantised concatenated signal. And the second communication node (102) is further configured to: concatenate the second received signal ($r_B$) and the third received signal to form a second concatenated signal; and quantise the second concatenated signal to form a second quantised concatenated signal; generate the second instance of the encryption key ($\kappa_B$) based on the second quantised concatenated signal.

In an embodiment the relay node (503) comprises a second antenna. The first communication node (101) is further configured to: transmit the first communication via a third communication channel ($H_k^{(2)}$) between the first communication node (101) and the second antenna of the relay node (503). The second communication node (102) is further configured to transmit the second communication via a fourth communication channel ($G_k^{(2)}$) between the second communication node (102) and the second antenna of the relay node; and the relay node (103) is further configured to: receive the first communication; and in response to receiving the first communication: estimate the third communication channel ($H_k^{(2)}$); receive, the second communication; and in response to receiving the second communication: estimate a fourth communication channel ($G_k^{(2)}$); generate a second transmission signal ($x_2$); transmit the second transmission signal ($x_1$) via the third communication channel ($H_k^{(2)}$) and the fourth communication channel ($G_k^{(2)}$); wherein: the second transmission signal ($x_2$) is generated such that the combination of the first transmission signal ($x_1$) transmitted via the first communication path ($H_k^{(1)}$) and the second transmission signal ($x_2$) transmitted via the third communication path ($H_k^{(2)}$) equals the combination of the first transmission signal ($x_1$) transmitted via the second communication path ($G_k^{(1)}$) and the second transmission signal ($x_2$) transmitted via the fourth communication path ($G_k^{(2)}$).

According to a first aspect there is provided an apparatus (103; 503) for enabling generation of an encryption key, wherein: the apparatus (103; 503) comprises a first antenna; and the apparatus (103; 503) is configured to: receive a first communication comprising a first training packet; and in response to receiving the first communication, estimate a first communication channel ($H_k$; $H_k^{(1)}$) between the first antenna of the apparatus (103; 503) and a transmitter of the first communication; receive a second communication comprising a second training packet; and in response to receiving the second communication, estimate a second communication channel ($G_k$, $G_k^{(1)}$) between the first antenna of the apparatus (103; 503) and a transmitter of the second communication; generate a first transmission signal ($x_k$; $x_1$); and transmit the first transmission signal ($x_k$; $x_1$) via the first communication channel ($H_k$, $H_k^{(1)}$) and the second communication channel ($G_k$, $G_k^{(1)}$); wherein: the transmission signal ($x_k$) is generated such that a first received signal ($r_A$) received by the transmitter of the first communication is equal to the second received signal ($r_B$) received by the transmitter of the second communication.

In an embodiment the apparatus (103; 503) is further configured to: calculate, a null space (V) of a difference between the first communication channel ($H_k$) and the second communication channel ($G_k$); and generate the first transmission signal ($x_k$; $x_1$) based on the null space (V).

In an embodiment the apparatus is further configured to: select a codeword (q) from a codebook; determine an arbitrary vector (y); and generate the first transmission signal ($x_k$, $x_1$) based on the null space (V) and the arbitrary vector (y); wherein: the arbitrary vector (y) is determined such that the first received signal ($r_A$) and the second received signal ($r_B$) equals the codeword (q).

In an embodiment the first transmission signal ($x_k$; $x_1$) is an Orthogonal Frequency Division Multiplexing signal comprising a plurality of subcarriers, wherein the plurality of subcarriers comprises a plurality of sets of subcarriers, wherein each set of subcarriers has an equal number of subcarriers and subcarriers in a set convey a same data value.

In an embodiment the apparatus (503) further comprises comprising a second antenna; and the apparatus (503) is further configured to: receive the first communication via the second antenna; and in response to receiving the first communication: estimate a third communication channel ($H_k^{(2)}$) between the transmitter of the first communication and the second antenna of the apparatus (503); receive, the second communication via the second antenna; and in response to receiving the second communication: estimate a fourth communication channel ($G_k^{(2)}$) between the transmitter of the second communication and the second antenna of the apparatus (503); generate a second transmission signal ($x_2$); transmit the second transmission signal ($x_1$) via the third communication channel ($H_k^{(2)}$) and the fourth communication channel ($G_k^{(2)}$); wherein: the second transmission signal ($x_2$) is generated such that a combination of the first transmission signal ($x_1$) transmitted via the first communication path ($H_k^{(1)}$) and the second transmission signal ($x_2$) transmitted via the third communication path ($H_k^{(2)}$) equals a combination of the first transmission signal ($x_1$) transmitted via the second communication path ($G_k^{(1)}$) and the second transmission signal ($x_2$) transmitted via the fourth communication path ($G_k^{(2)}$).

According to a fourth aspect there is provided a method for enabling generation of an encryption key, performed by a communication apparatus (103; 503) comprising a first antenna. The method comprising: receiving a first communication comprising a first training packet; and in response to receiving the first communication, estimating a first communication channel ($H_k$; $H_k^{(1)}$) between the first antenna of the apparatus (103; 503) and a transmitter of the first communication; receiving a second communication comprising a second training packet; and in response to receiving the second communication, estimating a second communication channel ($G_k$, $G_k^{(1)}$) between the first antenna of the apparatus (103; 503) and a transmitter of the second communication; generating a first transmission signal ($x_k$; $x_1$); and transmitting the first transmission signal ($x_k$; $x_1$) via the first communication channel ($H_k$, $H_k^{(1)}$) and the second communication channel ($G_k$, $G_k^{(1)}$); wherein: the transmission signal ($x_k$) is generated such that a first received signal ($r_A$) received by the transmitter of the first communication is equal to the second received signal ($r_B$) received by the transmitter of the second communication.

In an embodiment the method further comprises calculating, a null space (V) of a difference between the first communication channel ($H_k$) and the second communication channel ($G_k$); and generating the first transmission signal ($x_k$; $x_1$) based on the null space (V).

In an embodiment the method further comprises selecting a codeword (q) from a codebook; determining an arbitrary vector (y); and generating the first transmission signal ($x_k$, $x_1$) based on the null space (V) and the arbitrary vector (y); wherein: the arbitrary vector (y) is determined such that the first received signal ($r_A$) and the second received signal ($r_B$) equals the codeword (q).

In an embodiment the first transmission signal ($x_k$; $x_1$) is an Orthogonal Frequency Division Multiplexing signal comprising a plurality of subcarriers, wherein the plurality of subcarriers comprises a plurality of sets of subcarriers, wherein each set of subcarriers has an equal number of subcarriers and subcarriers in a set convey a same data value.

In an embodiment the communication apparatus (103; 503) comprising a second antenna; and the method further comprises: receiving the first communication via the second antenna; and in response to receiving the first communication: estimating a third communication channel ($H_k^{(2)}$) between the transmitter of the first communication and the second antenna of the apparatus (503); receiving, the second communication via the second antenna; and in response to receiving the second communication: estimating a fourth communication channel ($G_k^{(2)}$) between the transmitter of the second communication and the second antenna of the apparatus (503); generating a second transmission signal ($x_2$); transmitting the second transmission signal ($x_1$) via the third communication channel ($H_k^{(2)}$) and the fourth communication channel ($G_k^{(2)}$); wherein: the second transmission signal ($x_2$) is generated such that a combination of the first transmission signal ($x_1$) transmitted via the first communication path ($H_k^{(1)}$) and the second transmission signal ($x_2$) transmitted via the third communication path ($H_k^{(2)}$) equals a combination of the first transmission signal ($x_1$) transmitted via the second communication path ($G_k^{(1)}$) and the second transmission signal ($x_2$) transmitted via the fourth communication path ($G_k^{(2)}$).

According to a fifth aspect there is provided a non-transitory computer-readable medium comprising computer program instructions suitable for execution by a processor, the instructions configured to, when executed by the processor: receive a first communication comprising a first training packet; and in response to receiving the first communication, estimate a first communication channel ($H_k$; $H_k^{(1)}$) between the first antenna of the apparatus (103; 503) and a transmitter of the first communication; receive a second communication comprising a second training packet; and in response to receiving the second communication, estimate a second communication channel ($G_k$, $G_k^{(1)}$) between the first antenna of the apparatus (103; 503) and a transmitter of the second communication; generate a first transmission signal ($x_k$; $x_1$); and transmit the first transmission signal ($x_k$; $x_1$) via the first communication channel ($H_k$, $H_k^{(1)}$) and the second communication channel ($G_k$, $G_k^{(1)}$); wherein: the transmission signal ($x_k$) is generated such that a first received signal ($r_A$) received by the transmitter of the first communication is equal to the second received signal ($r_B$) received by the transmitter of the second communication.

According to a sixth aspect there is provided a communication apparatus (101; 102) configured to: transmit a first communication via a first communication channel ($H_k$; $H_k^{(1)}$), wherein the first communication channel ($H_k$; $H_k^{(1)}$) is between the communication apparatus (101; 102) and a relay node (103; 503); and the first communication comprises a first training packet; estimate a first received signal ($r_A$); and generate a first instance of an encryption key ($\kappa_A$) based on the first received signal ($r_A$);

In an embodiment the first communication comprises a first training sequence that has been scrambled by a first scrambling sequence ($A_k$). And the communication apparatus (101; 102) is further configured to: scramble the first received signal ($r_A$) with the first scrambling sequence ($A_k$) to generate a scrambled first received signal; and quantise the scrambled first received signal to generate the first instance of the encryption key ($\kappa_A$).

In an embodiment the communication apparatus (101; 102) is further configured to: transmit the first communication via a second communication channel ($F_k$); estimate a second received signal received via the second communication channel ($F_k$); and generate the first instance of the encryption key based on the second received signal and the first received signal ($r_A$).

In an embodiment the communication apparatus (101; 102) is further configured to: quantise the first received signal ($r_A$) to form a first quantised received signal; quantise the second received signal to form a second quantised received signal; and generate the first instance of the encryption key ($\kappa_A$) according to a modulo-2 addition of the first quantised received signal and the second quantised received signal.

In an embodiment the communication apparatus (101; 102) is further configured to: concatenate the first received signal ($r_A$) and the second received signal to form a first concatenated signal; quantise the first concatenated signal to form a first quantised concatenated signal; and generate the first instance of the encryption key ($\kappa_A$) based on the first quantised concatenated signal.

In an embodiment The communication apparatus (101; 102) according to claim 24, further configured to transmit the first communication via a third communication channel ($H_k^{(2)}$).

According to a seventh aspect there is provided a method for generating an encryption key, the method comprising: transmitting a first communication via a first communication channel ($H_k$; $H_k^{(1)}$), wherein: the first communication channel ($H_k$; $H_k^{(1)}$) is between the communication apparatus (101; 102) and a relay node (103; 503); and the first communication comprises a first training packet; estimating a first received signal ($r_A$); and generating a first instance of an encryption key ($\kappa_A$) based on the first received signal ($r_A$).

In an embodiment the first communication comprises a first training sequence that has been scrambled by a first scrambling sequence ($A_k$); and the method further comprises: scrambling the first received signal ($r_A$) with the first scrambling sequence ($A_k$) to generate a scrambled first received signal; and quantising the scrambled first received signal to generate the first instance of the encryption key ($\kappa_A$).

In an embodiment the method further comprises: transmitting the first communication via a second communication channel ($F_k$); estimating a second received signal received via the second communication channel ($F_k$); and generating the first instance of the encryption key based on the second received signal and the first received signal ($r_A$).

In an embodiment the method further comprises quantising the first received signal ($r_A$) to form a first quantised received signal; quantising the second received signal to form a second quantised received signal; and generating the first instance of the encryption key ($\kappa_A$) according to a modulo-2 addition of the first quantised received signal and the second quantised received signal.

In an embodiment the method further comprises concatenating the first received signal ($r_A$) and the second received signal to form a first concatenated signal; quantising the first concatenated signal to form a first quantised concatenated signal; and generating the first instance of the encryption key ($\kappa_A$) based on the first quantised concatenated signal.

In an embodiment the method further comprises transmitting the first communication via a third communication channel ($H_k^{(2)}$).

According to an eighth aspect there is provided a non-transitory computer-readable medium comprising computer program instructions suitable for execution by a processor, the instructions configured to, when executed by the processor: transmit a first communication via a first communication channel ($H_k$; $H_k^{(1)}$), wherein: the first communication channel ($H_k$; $H_k^{(1)}$) is between the communication apparatus (101; 102) and a relay node (103; 503); and the first communication comprises a first training packet; estimate a first received signal ($r_A$); and generate a first instance of an encryption key ($\kappa_A$) based on the first received signal ($r_A$).

FIG. 1 shows a wireless network according to an embodiment. FIG. 1 shows a wireless network comprising a first communication node 101 named 'Alice', a second communication node 102 named 'Bob' and a relay node 103. In FIG. 1 the first communication node 101 and the second communication node 102 communicate with each other via the relay node 103.

A wireless channel refers to the transmission medium between two communication nodes. The characteristics of a wireless signal change as it moves from a transmitting node to a receiving node. The profile of the received signal can be obtained from the transmitted signal and vice versa if a channel model of the medium between the two nodes is known. A channel model is a theoretical model of the channel that is used for analysis and evaluation.

In FIG. 1 the channel between the first communication node 101 named 'Alice' and the relay node 103 is represented by a first channel, $H_k$, and the channel between the second communication node 102 named 'Bob' and the relay node 103 is represented by a second channel, $G_k$.

Three assumptions are made of the communication channels between the nodes, these being that the communication channels are: reciprocal, random, and uncorrelated with an eavesdropper's channel. As discussed further below, the wireless communication channel being reciprocal ensures that both the first communication node 101 named 'Alice' and the second communication node 102 named 'Bob' can generate the same cryptographic key from their respective channel observations. The wireless communication channel being random enables different cryptographic keys to be generated over time, and the wireless communication being uncorrelated with an eavesdroppers channel prevents the eavesdropper from extracting information from its own observations.

Figure 2:
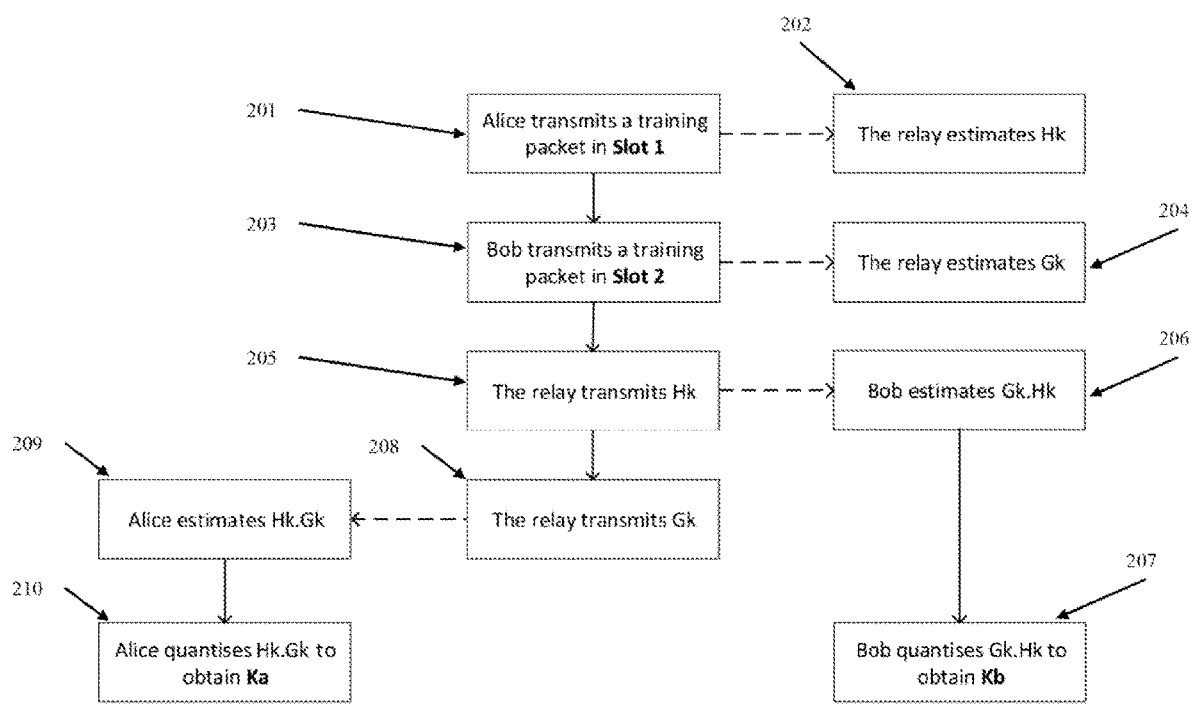
FIG. 2 shows a known Amplify-and-Forward (AF) scheme for generating secret keys using a relay.

FIG. 2 shows a known Amplify-and-Forward (AF) scheme for generating secret keys using a relay. In particular, FIG. 2 shows a method of generating a secret communication key in the wireless network of FIG. 1 where the frequency response of the channel (e.g., $H_k$) is exploited to generate a secret key. In the known Amplify-and-Forward (AF) scheme of FIG. 2, signals are communicated in an Orthogonal Frequency Division Multiplexing (OFDM) system, that is to say that OFDM signals are used to communicate training packets and signals that are proportional to the channels as is discussed in more detail below.

In a first time slot, the first time communication node 101 named 'Alice' transmits a training packet in step 201 that is received by the relay node 103. The training packet is known by the relay node 103. The relay node subsequently estimates the first channel, $H_k$, in step 202 based on the received signal and the known training packet.

In a second timeslot, the second communication node 102 named 'Bob' transmits a training packet in step 203 that is received by the relay node 103. The training packet is known by the relay node 103. The relay node subsequently estimates the second channel, $G_k$, in step 204 based on the received signal and the known training packet.

The relay node 103 subsequently transmits information quantifying the properties of the first channel, $H_k$, in step 205. Optionally, the parameters of the first channel, $H_k$, estimated by relay node 103 are appropriately scaled before transmission. Scaling could be applied, for example, to ensure a desired transmit power is used. The information quantifying the properties of first channel, $H_k$, is subsequently received by the second communication node 102 named 'Bob'.

Since this signal has been communicated across the second channel, $G_k$, the signal received by the second communication node 102 named 'Bob' represents the parameters of the first channel, $H_k$, multiplied by the parameters of the second channel, $G_k$, i.e. $G_k H_k$. In step 206 the second communication node 102 named 'Bob' estimates the received signal, i.e. $G_k H_k$ and subsequently quantises the received signal (i.e. $G_k H_k$) in step 207 to obtain a first secret key, $\kappa_B$. Or in other words: $\kappa_B = \mathbb{Q}\{G_k H_k\}$, where $\mathbb{Q}$ is a quantisation function that generates Q bits: $\mathbb{Q}:\mathbb{C}^N \to \{0,1\})^Q$. Various quantisation techniques are known including the quantisation technique described in S. N. Premnath, S. Jana, J. Croft, P. L. Gowda, M. Clark, S. K. Kasera, N. Patwari, and S. V. Krishnamurthy, "Secret key extraction from wireless signal strength in real environments," IEEE Transactions on mobile Computing, vol. 12, no. 5, pp. 917-930, 2013 which is incorporated herein by reference. In this technique the samples between a received signal strength upper threshold and a received signal strength lower threshold are dropped and values greater than the upper threshold are encoded as 1, and values lower than the lower threshold are encoded as zero.

It will be noted that the first communication node 101 named 'Alice' also receives the transmission from the relay node 103 in step 205. However, unlike the second communication node 102, the first communication node 101 named 'Alice' ignores this message.

After transmitting information quantifying properties of the first channel, $H_k$, the relay node 103 transmits information quantifying the properties of the second channel, $G_k$. Optionally, the parameters of the second channel, $G_k$, estimated by relay node 103 are appropriately scaled before transmission. The transmitted information quantifying the properties of second channel, $G_k$, is subsequently received by the first communication node 101 named 'Alice'. Since this signal has been communicated across the first channel, $H_k$, the signal received by the first communication node 101 named 'Alice' represents the parameters of the first channel, $H_k$, multiplied by the parameters of the second channel, $G_k$, i.e. $G_k H_k$. This is a property of communicating the signals in Orthogonal Frequency Division Multiplexing (OFDM) system.

In step 209 the first communication node 101 named 'Alice' estimates the received signal, i.e. $G_k H_k$ and subsequently quantises the received signal (i.e. $G_k H_k$) in step 210 to obtain a second $\mathbb{Q}$ secret key, $\kappa_a$. Or in other words: $\kappa_a = \mathbb{Q}\{G_k H_k\}$, where $\mathbb{Q}$ is a quantisation function that generates Q bits: $\mathbb{Q}:\mathbb{C}^N \to \{0,1\}^Q$. The same quantisation function discussed above in connection with the second communication node 102 can be used by the first communication node 101.

Since the first communication node 101 named 'Alice' and the second communication node 102 named 'Bob' have the same composite channel available to them, a common secret key is generated in steps 207 and 210. In the case where a scaled version of the first channel, $H_k$, and/or a scaled version of the second channel, $G_k$, are transmitted by the relay node 103, the quantisation function $\mathbb{Q}$ must be independent of any multiplication of a scalar (i.e. independent of any scaling).

With the approach described above, it is possible for the first communication node 101 named 'Alice' and the second communication node 102 named 'Bob' to generate a secure shared secret key using the random properties of the wireless communication channel. However, this technique requires two timeslots for the relay node 103 to transmit signals to the first communication node 101 named 'Alice' and the second communication node 102 named 'Bob' (i.e. timeslots for steps 205 and 208).

Figure 3:
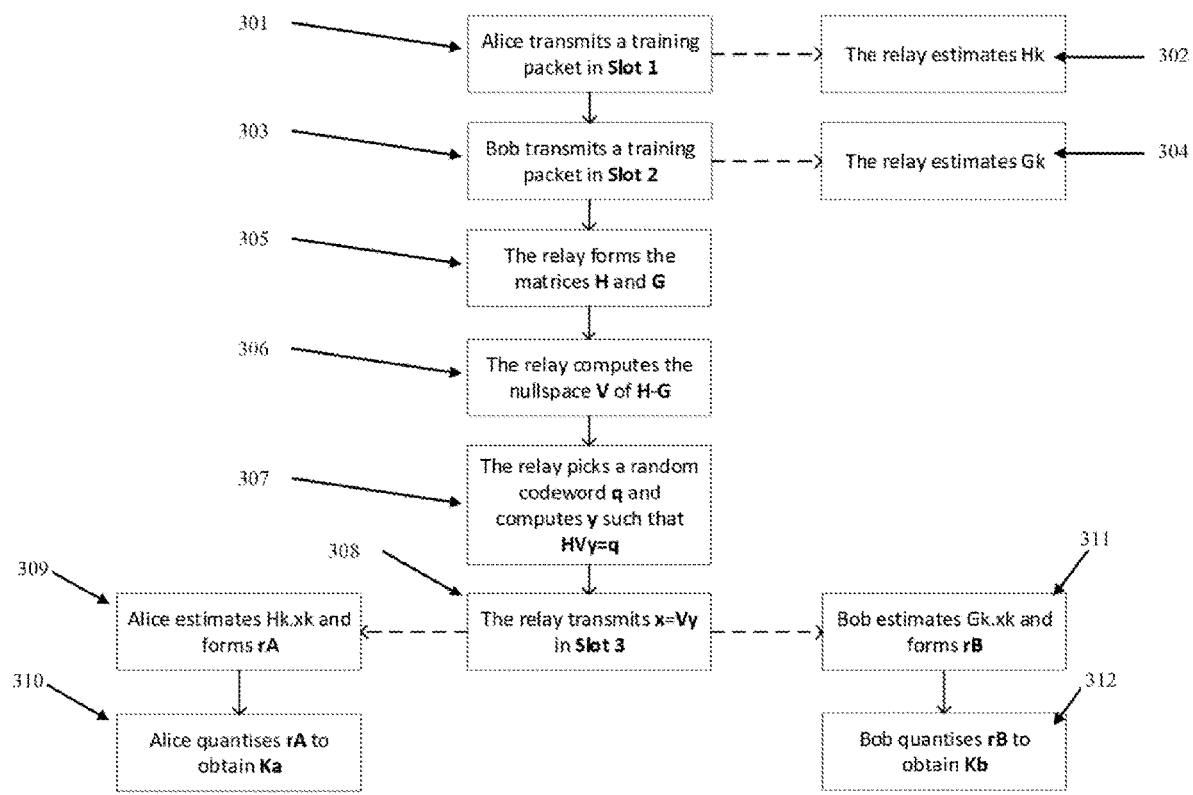
FIG. 3 shows a method of generating a shared secret key according to an embodiment.

FIG. 3 shows a method of generating a shared secret key according to an embodiment. The method of FIG. 3 will be described in relation to the wireless network shown in FIG. 1. In the method of FIG. 3 signals (e.g. training packets and transmission signals) are communicated using Orthogonal Frequency Division Multiplexing (OFDM) signals. That is to say that the data of the training packets and the transmission signals are modulated onto OFDM subcarriers of an OFDM signal for transmission across the wireless network.

The method begins in step 301 by the first communication node 101 named 'Alice' transmitting a first training packet that is known to the first communication node 101 and the relay node 103.

The first training packet is transmitted by the first communication node 101 named 'Alice' via the first channel, $H_k$, and is subsequently received by the relay node 103. The signal received by the relay node 103 corresponds to the training packet multiplied by the first channel, $H_k$. Since the first training packet is known, it is possible for the relay node 103 to estimate the first channel, $H_k$. The relay node 103 estimates the first channel, $H_k$, in step 302 in response to receiving the training packet transmitted by the first communication node 101 in step 301.

In step 303 the second communication node 102 named 'Bob' transmits a second training packet in a second timeslot. The second training packet is known to the second communication node 102 and the relay node 103. The second training packet may be identical to the first training packet. The second training packet is communicated via the second channel, $G_k$, and is subsequently received by the relay node 103. The relay node 103 subsequently estimates the second channel, $G_k$, based on the received signal and the known second training packet in step 304.

In the method of FIG. 3 the relay node 103 computes a transmission signal, $x_k$, which will result in the same signal being received at the first communication node 101 and the second communication node 102 once the transmission signal, $x_k$, has been communicated via the first channel, $H_k$, and the second channel, $G_k$, respectively. Thereby enabling both the first communication node 101 and the second communication node 102 to generate a common secret key from their respective received signals.

In step 305 the relay forms a first matrix, H, and a second matrix G. The generation of the first matrix, H, and the second matrix, G, will now be discussed in detail.

When a relay node 103 transmits the transmission signal, $x_k$, the first communication node 101 named 'Alice' will receive $H_k x_k$, i.e. the combination of the transmission signal, $x_k$, and the first channel, $H_k$. When the transmission signal comprises N values, each value being associated with one of N subcarriers of an OFDM signal, the signal received by the first communication node 101 named 'Alice', i.e. $r_A$, is represented by:

$$r_A = H_0 x_0 + H_1 x_1 + H_{D-1} x_{D-1} + H_D x_D + \ldots + H_{N-1} x_{N-1}$$

Where the transmission signal, $x_k$, is split into a number of equal parts and D represents the number of values in each part. The received signal, $r_A$, can be converted into a D×1 vector such that:

$$r_A = \begin{pmatrix} H_0 x_0 + H_D x_D + \cdots H_{N-D} x_{N-D} \\ \vdots \\ H_{D-1} x_{D-1} + H_{2D-1} x_{2D-1} + \cdots H_{N-1} x_{N-1} \end{pmatrix}$$

If the transmitted signal is such that $x_k = x\lfloor k/D \rfloor_D$ i.e. the transmitted signal consists of D repeated values, followed by another D repeated values then the receives signal, $r_A$, can be written as a matrix-vector product:

$$r_A = \begin{pmatrix} H_0 & \cdots & H_{N-D} \\ \vdots & \ddots & \vdots \\ H_{D-1} & \cdots & H_{N-1} \end{pmatrix} \begin{pmatrix} x_0 \\ \vdots \\ x_{N-D} \end{pmatrix} = Hx$$

Where:

$$r_A \in \mathbb{C}^{D \times 1}, \; H \in \mathbb{C}^{D \times \frac{N}{D}}, \; x \in \mathbb{C}^{\frac{N}{D} \times 1}$$

The signal received by the second communication node 101 named 'Bob', $r_B$, can be expressed in a similar way when a transmission signal, $x_k$, is transmitted by the relay node 103 and the transmission signal, $x_k$, comprises D repeated values, followed by another D repeated values, with each value being associated with one of N subcarriers in an OFDM. In this case the signal received by the second communication node 102 named 'Bob', $r_B$, can be expressed as:

$$r_B = \begin{pmatrix} G_0 & \cdots & G_{N-D} \\ \vdots & \ddots & \vdots \\ G_{D-1} & \cdots & G_{N-1} \end{pmatrix} \begin{pmatrix} x_0 \\ \vdots \\ x_{N-D} \end{pmatrix} = Gx$$

Where:

$$r_B \in \mathbb{C}^{D \times 1}, \; G \in \mathbb{C}^{D \times \frac{N}{D}}$$

In step 305 the relay 103 forms the first matrix, H, and the second matrix G based on its knowledge of the respective channels from the transmissions in steps 301 and 303. The method proceeds to step 306 where the relay 103 computes the null space of H−G.

In order for the first communication node 101 named 'Alice' and the second communication node 102 named 'Bob' to receive the same signal, and therefore generate the same secret key, it is necessary that $r_A = r_B$ or in other words: Hx=Gx.

This can be achieved by choosing x, i.e. the transmission signal, such that (H−G)x=0, or in other words, the transmission signal, x, must be in the null space of H−G. This subspace has dimension $$\frac{N}{D} - D$$

and in order for the subspace to contain more than the trivial solution x=0, it is assumed that $$D < \frac{N}{D},$$

where D is the number of rows in the first matrix, H, and the second matrix G and N is the number of OFDM subcarriers. The null space of H−G is denoted by V, where $$V \in \mathbb{C}^{\frac{N}{D} \times \left(\frac{N}{D} - D\right)}.$$

Given the above, it is possible to choose any transmitted signal as:

$$x = Vy$$

Where:

$$y \in \mathbb{C}^{\left(\frac{N}{D} - D\right) \times 1}$$

is an arbitrary vector, and V is the null space of H−G. Choosing x, the transmission signal, in this way guarantees that x, the transmission signal, is in the null space of H−G and therefore results in the same signal being received by the nodes when communicated via different wireless channels.

Optionally, the arbitrary vector, y, is chosen such that Hx (and Gx) is identical or close to a quantised channel value. This is advantageous because it means the method of generating secret keys using the wireless channel is robust to noise and estimation errors.

In an embodiment a random codeword from the quantiser code book, $q \in \mathbb{C}^{D \times 1}$, is chosen. As known in the art, a quantiser codebook is a collection of the possible outputs that could result when a signal is quantised using a quantiser.

Or in other words, the quantiser codebook is a set of codewords representing the signal The random codeword selected from the quantiser code book, q, represents the signal that will be received by the communication node. In this case the arbitrary vector, y, is chosen so that HVy=q. Since the first matrix H, the null space of H–G (i.e. V) and the codeword from the quantiser codebook, q, are known, it is possible for the relay node 103 to compute the required arbitrary vector, y, according to y=(HV)⁺ q where ( . . . )⁺ denotes the pseudoinverse.

Since $$HV \in \mathbb{C}^{D \times \left(\frac{N}{D} - D\right)},$$

it is required that $$D \le \frac{N}{D} - D \Rightarrow D \le \sqrt{\frac{N}{2}}$$

for the equation to be solvable. It is possible that HV may not have full rank D but the probability of this is very small if H contains random channel samples.

Returning to the method shown in FIG. 3. After computing the null space, V, of H–G in step 306 the method proceeds to step 307 where the relay node 103 picks a random codeword from the quantiser code book, q, and computes y, an arbitrary vector, such that HVy=q.

In step 308 the relay node 103 transmit the transmission signal $x_k$ in a third time slot, where $x_k$=Vy.

This signal is received by the first communication node 101 named 'Alice'. The first communication node 101 named 'Alice' will receive $H_k x_k$ since the transmission signal, $x_k$, is transmitted via the first channel, $H_k$. In step 309 the first communication node 101 estimates $H_k x_k$ and then reshapes the received signal $r_A$ as discussed above i.e.:

$$r_A = \begin{pmatrix} H_0 x_0 + H_D x_D + \ldots H_{N-D} x_{N-D} \\ \vdots \\ H_{D-1} x_{D-1} + H_{2D-1} x_{2D-1} + \ldots H_{N-1} x_{N-1} \end{pmatrix} = Hx = HVy = q$$

The first communication node 101 named 'Alice' subsequently quantises the received signal, $r_A$, to generate a first instance of a secret key according to $\kappa_A = \mathbb{Q}\{r_A\}$, where $\mathbb{Q}$ is a quantisation function that generates Q bits: $\mathbb{Q}: \mathbb{C}^N \to \{0, 1\}^Q$.

Likewise, the signal transmitted by the relay node 103 in step 308 is also received by the second communication node 102 named 'Bob'. The second communication node 102 named 'Bob' will receive $G_k x_k$ since the transmission signal, $x_k$, is transmitted via the second channel, $G_k$. In step 311 the second communication node 102 estimates $G_k x_k$ and then reshapes the received signal $r_B$ as discussed above i.e.:

$$r_B = \begin{pmatrix} G_0 x_0 + G_D x_D + \ldots G_{N-D} x_{N-D} \\ \vdots \\ G_{D-1} x_{D-1} + G_{2D-1} x_{2D-1} + \ldots G_{N-1} x_{N-1} \end{pmatrix} = Gx = Hx = HVy = q$$

The second communication node 102 named 'Bob' subsequently quantises the received signal, $r_B$, to generate a second instance of a secret key according to $\kappa_B = \mathbb{Q}\{r_B\}$, where $\mathbb{Q}$ is a quantisation function that generates Q bits: $\mathbb{Q}: \mathbb{C}^N \to \{0, 1\}^Q$. Since the signal received by the first $\mathbb{Q}$ communication node 101, $r_A$, is the same as the signal received by the second communication node 102, $r_B$, (in the noiseless case), the resulting secret key generated by each node will be identical.

Figure 4:
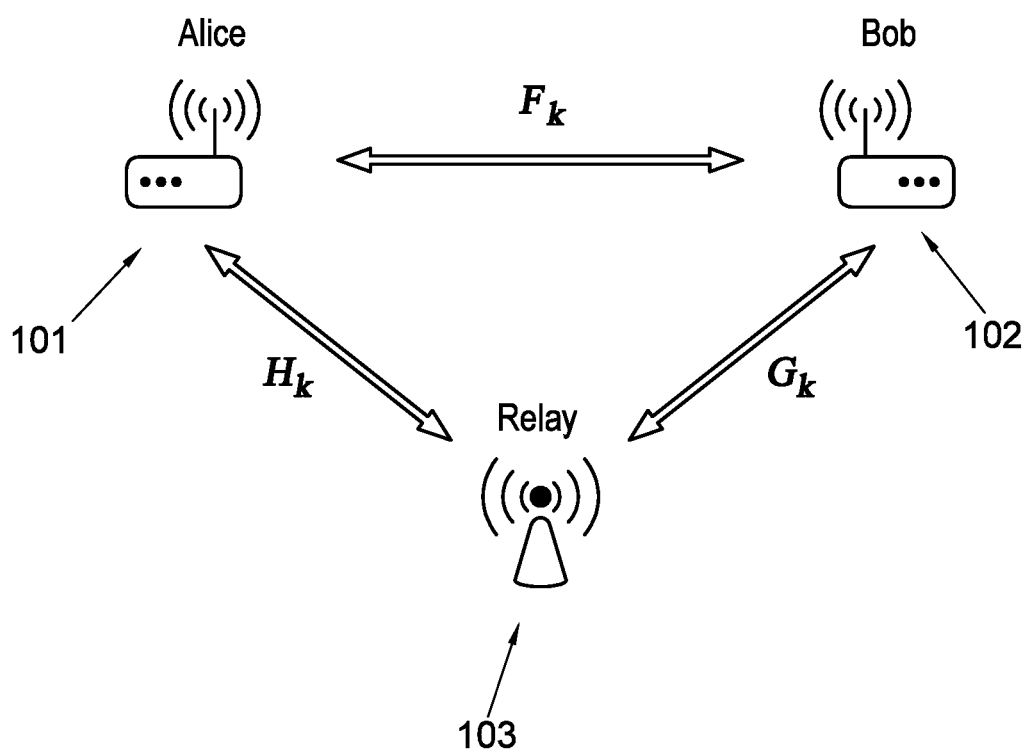
FIG. 4 shows a wireless network according to an embodiment.

FIG. 4 shows a wireless network according to an embodiment. FIG. 4 shows a wireless network comprising a first communication node 101 named 'Alice', a second communication node 102 named 'Bob' and a relay node 103. In FIG. 4 there are two communication paths, a first communication path directly between the first communication node 101 named 'Alice' and the second communication node 102 named 'Bob', as well as a second communication path via the relay node 103.

In an embodiment the properties of both communication paths are used to generate a shared secret key. In this embodiment a secret key is generated by further exploiting a direct link between 'Alice' and 'Bob'. In brief, a first secret key is generated with the aid of the relay node 103 following the same procedure as described above in relation to FIG. 3. In the arrangement shown in FIG. 4 there is also a direct 'Alice'-'Bob' link, this direct link between 'Alice' and 'Bob' represents a third channel, $F_k$, and is exploited in an embodiment to generate a second secret key.

For example, in step 301 when the first communication node 101 named 'Alice' transmits a training packet in slot 1, as well as being received by the relay node 103 in step 302, this training packet is also received by the second communication node 102 named 'Bob', via the third channel, $F_k$. In response to receiving the training packet transmitted in slot 1, the second communication node 102 named 'Bob' estimates, based on the received signal and the known training packet, the properties of the third channel, $F_k$, and quantises the third channel, $F_k$, in order to obtain a second secret key.

In step 303 when the second communication node 102 named 'Bob' transmits a training packet in slot 2, as well as being received by the relay node in step 304, this training packet is also received by the first communication node 101 named 'Alice', via the third channel, $F_k$. In response to receiving the training packet transmitted in slot 2, the first communication node 101 named 'Alice' estimates, based on the received signal and the known training packet, the properties of the third channel, $F_k$, and quantises the third channel, $F_k$, in order to obtain the second secret key.

Since the third channel, $F_k$, is reciprocal the properties of the communication channel are the same irrespective of the communication direction. As a result, the same signal will be received by the first communication node 101 and the second communication node 102 provided the same signal is transmitted (i.e. the training packet in this case). Consequently, although the first communication node 101 named 'Alice' and the second communication node 102 named 'Bob' generate the second secret key independently they will likely be the same (i.e. they have a high probability of being the same).

In an embodiment the final common secret key is the modulo-2 sum of the two keys (i.e. the secret key generated using the relay node and the method of FIG. 3 and the second secret key generated via the third channel, $F_k$). In this case the modulo-2 addition is performed by the first communication node 101 and the second communication node 102 respectively.

In a different embodiment the first communication node 101 named 'Alice' and the second communication node 102 named 'Bob' concatenate their channel observations (i.e. the received signals) into a vector. These vectors are subsequently quantised by the first and second communication nodes in order to generate a shared secret key.

In both cases, the advantage of this approaches is that the relay node 103 does not know the final secret key used to encrypt communications between the first communication node 101 and the second communication node 102. This is because the relay node 103 is unable to determine the properties of the third channel, $F_k$. As a result, the relay node 103 does not necessarily need to be trusted by the users of the system. As such the relay node 103 can be implemented using an untrusted node (i.e. "nice but curious") in this system.

In a different embodiment a scrambling sequence is applied by the first communication node 101 named 'Alice' and by the second communication node 102 named 'Bob'. For the avoidance of doubt it is noted that the use of a scrambling sequence does not require a third channel, $F_k$ and will be discussed in relation to the arrangement of FIG. 1.

As known in the art, scrambling is a process in which data is multiplied with a scrambling sequence to randomize the data. The scrambling sequence may be a pseudo-random number (PN) sequence having good spectral and correlation properties.

The first communication node 101 generates a scrambling sequence locally (i.e. at the first communication node 101). This scrambling sequence is not shared with other nodes. The first communication node 101 named 'Alice' transmits a training packet which has been scrambled by a first scrambling sequence, $A_k$. In response to receiving the communication transmitted by the first communication node 101 the relay node 103 determines the first channel, $H_k$, based on the received signal and the known training packet as described in relation to FIG. 3. However, unlike in FIG. 3 the relay node 103 in this embodiment estimates the effect of the first channel, $H_k$, and the first scrambling sequence, $A_k$, on the training packet (i.e. $H_k A_k$). Consequently, the relay node 103 estimates a first effective channel, $\tilde{H}$.

Likewise, the second communication node 102 named 'Bob' generates a scrambling sequence locally (i.e. at the second communication node 102). This scrambling sequence is not shared with other nodes. The second communication node 102 named 'Bob' transmits a training packet which has been scrambled by a second scrambling sequence, $B_k$. The relay node 103 subsequently estimates the effect of the second channel, $G_k$ and the second scrambling sequence $B_k$ on the training packet (i.e. $G_k B_k$). Consequently, the relay node 103 estimates a second effective channel, $\tilde{G}$.

The same procedure described in relation to FIG. 3 is applied by the relay node 103 making the necessary changes. For example, in step 306 the relay node 103 computes a transmission signal, x, such that $(\tilde{H}-\tilde{G})x=0$.

The relay node 103 transmits the transmission signal, as in step 308, however in this example the signal received by the first communication node 101 named 'Alice' is the pre-coded signal $H_k x_k$. Likewise the second communication node 102 named 'Bob' receives the pre-coded signal $G_k x_k$. In order to obtain the same signal at each communication node, the nodes apply their locally generated scrambling sequences. More specifically, the first communication node 101 named 'Alice' applies the first scrambling sequence, $A_k$, to the received signal (i.e. $H_k x_k$), thereby obtaining $H_k A_k x_k$, in effect making an effective communication channel of $H_k A_k$.

Likewise, the signal received by the second communication node 102 named 'Bob' (i.e. $G_k x_k$) is scrambled by the second scrambling sequence, $B_k$, to obtain $G_k B_k x_k$, in effect making an effective communication channel of $G_k B_k$. Since the transmission signal, x, was selected such that $(\tilde{H}-\tilde{G})x=0$, the signals at the first and second communication nodes will be the same after the received signals have been scrambled by the local generally generated scrambling sequences.

A common secret key is subsequently generated at each communication node based on the scrambled received signals.

An advantage of using a scrambling sequence in this way is that the effective communication channels (i.e. $H_k A_k$ and $G_k B_k$) can be made more random and time-varying (e.g. by applying different scrambling sequences in different key-generation exchanges). This can be useful in frequency-flat and/or static propagation environments because it adds a level of variation to the channel (and therefore the generated key) that would not otherwise be present.

Figure 5:
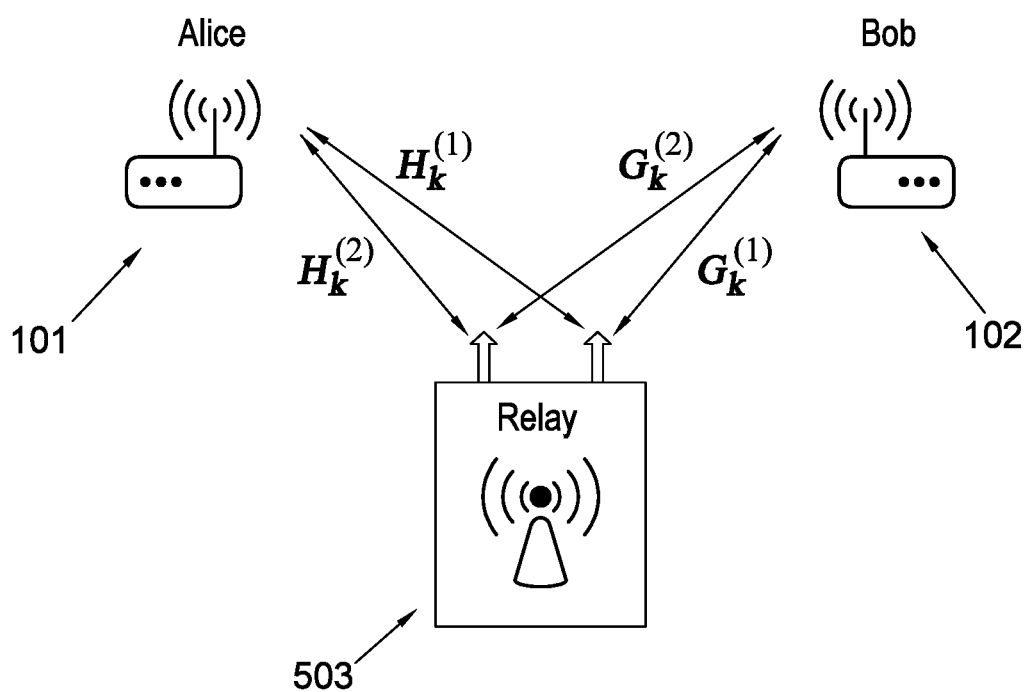
FIG. 5 shows a wireless network according to another embodiment.

FIG. 5 shows a wireless network according to another embodiment. FIG. 5 shows a wireless network comprising a first communication node 101 named 'Alice', a second communication node 102 named 'Bob' and a relay node 503. The relay node 503 comprises multiple antennas whereas the first communication node 101 and the second communication node 102 both comprise a single antenna. In the example of FIG. 5 the relay node 503 comprises two antennas for transmission and reception. However, for the avoidance of doubt it is emphasized that the below method could be used with a relay node comprising more than two antennas.

The two antennas at the relay node 503 create two communication paths between the first communication node 101 named 'Alice' and the relay node 503, specifically a first communication path, $H_k^{(1)}$, between the first communication node 101 and a first antenna of the relay node 503, and a second communication path, $H_k^{(2)}$, between the first communication node 101 and a second antenna of the relay node 503.

Likewise, there are also two communication paths between the second communication node 102 named 'Bob' and the relay node 503, specifically a third communication path, $G_k^{(1)}$, between the second communication node 102 named 'Bob' and the first antenna of the relay node 503, and a fourth communication path, $G_k^{(2)}$, between the second communication node 102 and the second antenna of the relay node 503.

As discussed below, the first, second, third and fourth communication paths (i.e. $H_k^{(1)}$, $H_k^{(2)}$, $G_k^{(1)}$, and $G_k^{(2)}$) are estimated by the relay node 503 when the first and second communication nodes transmit a training packet. If the relay node 503 transmits a first transmission signal, $X_k^{(1)}$, from the first antenna, and a second transmission signal, $X_k^{(2)}$, from a second antenna, then these signals would add up over the air and the first communication node 101 named 'Alice' would receive $H_k^{(1)}X_k^{(1)}+H_k^{(2)}X_k^{(2)}$, and the second communication node 102 named 'Bob' would receive $G_k^{(1)}X_k^{(1)}+G_k^{(2)}X_k^{(2)}$.

These signals can be reshaped into $H_1 x_1 + H_2 x_2$ and $G_1 x_1 + G_2 x_2$ using the same procedure as discussed in relation to FIG. 3. In order to ensure the signal received by the first communication node and the second communication node are equal (and therefore generate the same secret key) it is a requirement that $$H_1 x_1 + H_2 x_2 = G_1 x_1 + G_2 x_2 \Rightarrow (H_1 - G_1 \quad H_2 - G_2)\begin{pmatrix} x_1 \\ x_2 \end{pmatrix} = 0.$$

Hence, the first transmission signal, $x_1$, and the second transmission signal, $x_2$, are chosen by the relay node 503 to be in the null space of $(H_1-G_1 \; H_2-G_2)$ which has the size $$D \times \frac{2N}{D}.$$

Figure 6:
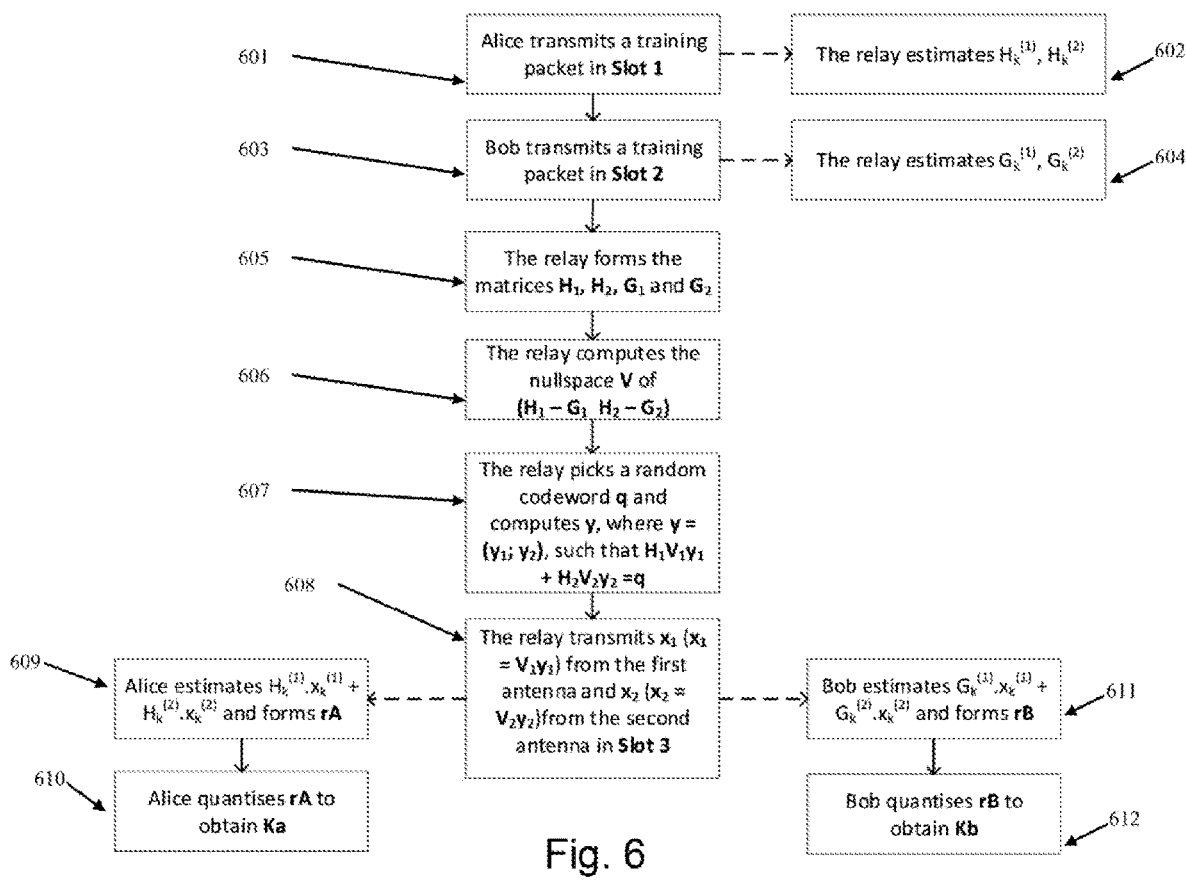
FIG. 6 shows a method of generating a shared secret key using a relay station comprising multiple antennas according to an embodiment.

FIG. 6 shows a method of generating a shared secret key using a relay station comprising multiple antennas according to an embodiment. FIG. 6 is a modified version of FIG. 3 in order to account for the multiple communication channels between the relay node 503 and the first and second communication nodes.

In step 601 the first communication node 101 transmits a training packet in a first timeslot. The training packet transmitted by the first communication node 101 is received by the relay node 503.

In step 602 the relay node 503 estimates a first communication path, $H_k^{(1)}$, between the first communication node 101 and a first antenna of the relay node 503, and a second communication path, $H_k^{(2)}$, between the first communication node 101 and a second antenna of the relay node 503 based on the received signal and the known training packet.

In step 603 the second communication node 102 transmits a training packet in a second timeslot. The training packet transmitted by the second communication node 102 is received by the relay node 503. In step 604 the relay node 503 estimates a third communication path, $G_k^{(1)}$, between the second communication node 102 named 'Bob' and the first antenna of the relay node 503, and a fourth communication path, $G_k^{(2)}$, between the second communication node 102 and the second antenna of the relay node 503.

In step 605 the relay node 503 forms matrices for the first communication channel, $H_1$, the second communication channel, $H_2$, the third communication channel, $G_1$, and the fourth communication channel $G_2$ as discussed in relation to FIG. 3 based on the received signal and the known training sequence.

In step 606 the relay node 503 computes the null space, V, of $(H_1-G_1 \; H_2-G_2)$, the null space in this example is $$V \in \mathbb{C}^{\frac{2N}{D} \times \left(\frac{2N}{D}-D\right)}.$$

Optionally, in step 607 the relay node 503 picks a random codeword a random codeword from the quantiser code book, q, and computes $y_1$ and $y_2$, two arbitrary vectors, such that $H_1 V_1 y_1 + H_2 V_2 y_2 = q$.

In step 608 the relay node 503 transmits, in a third time slot, a first transmission signal, $x_1$ ($x_1=V_1 y_1$) from the first antenna, and the second transmission signal, $x_2$ ($x_2=V_2 y_2$) from the second antenna. In the case when a random codeword is not chosen, the respective transmission signals represent a row in the null space.

In step 609 the relay node 503 estimates $H_1 x_1 + H_2 x_2$ and forms the received signal $r_A$ matrix. In step 610 the first communication node 101 named 'Alice' quantises the received signal to generate a secret key according to $\kappa_A = \mathbb{Q}\{r_A\}$, where $\mathbb{Q}$ is a quantisation function that generates Q bits: $\mathbb{Q}: \mathbb{C}^N \to \{0,1\}^Q$. $\mathbb{C}$ Likewise, in step 611 the relay node 503 estimates $G_1 x_1 + G_2 x_2$ and forms the received signal $r_B$ matrix. In step 611 the second communication node 102 named 'Bob' quantises the received signal to generate a secret key according to $\kappa_B = \mathbb{Q}\{r_B\}$, where $\mathbb{Q}$ is a quantisation function that generates Q bits: $\mathbb{Q}: \mathbb{C}^N \to \{0,1\}^Q$.

Although the above method is described in relation to the relay node 503 having two antennas, it is emphasised that the relay node 503 could comprise more than two antennas. In this case the above described method is adapted to find a null space, V, of $(H_1-G_1 \; H_2-G_2 \; \ldots \; H_M-G_M)$, where M is the number of antennas. Similar alterations to the method are made in steps 607 and 608.

In a further embodiment the precoder described above (or in other words, the transmission signal precoded to achieve the same received signal at the first and second communication nodes) is computed in a more efficient manner.

Firstly the unconstrained precoder is found by partitioning the channel matrix $\overline{H}=(\overline{H}_1 \; \ldots \; \overline{H}_M)$ $$\overline{H}\overline{x} = (\overline{H}_1 \; \overline{H}_2)\binom{\overline{x}'}{0} = q \Rightarrow \overline{x} = \overline{H}_1^{-1} q$$

where $\overline{H}_1 \in \mathbb{C}^{D \times D}$, $\overline{x}' \in \mathbb{C}^{D \times 1}$.

From the Singular Value Decomposition (SVD) $\overline{H}-\overline{G} = U \Sigma (\overline{V}_1 \; \overline{V}_2)^H$, we can find $$\overline{V}_1 \in \mathbb{C}^{\frac{MN}{D} \times D}$$

which is a basis for the column space of $\overline{H}-\overline{G}$.

Note that $\overline{U}$, $\Sigma$ and $\overline{V}_2$ are not needed and that the column basis $\overline{V}_1$ can be efficiently computed using, e.g., the technique described in D. Milford and M. Sandell, "Singular value decomposition using an array of CORDIC processors," Sign. Proc., vol. 102, pp. 163-170, September 2014, which is incorporated herein by reference. If the column basis is partitioned as $$\overline{V}_1 = \binom{\overline{W}_1}{\overline{W}_2}$$

where $$\overline{W}_1 \in \mathbb{C}^{D \times D}, \; \overline{W}_2 \in \mathbb{C}^{\left(\frac{MN}{D}-D\right) \times D},$$

projection onto the orthogonal complement of $\overline{V}_1$, i.e., the null space of $\overline{H}-\overline{G}$, can be computed as $$\overline{x} = (I - \overline{V}_1 \overline{V}_1^H)\binom{\overline{x}'}{0} = \left(I - \binom{\overline{W}_1}{\overline{W}_2}\binom{\overline{W}_1}{\overline{W}_2}^H\right)\binom{\overline{x}'}{0} = \binom{I - \overline{W}_1 \overline{W}_1^H}{-\overline{W}_2 \overline{W}_1^H}\overline{x}'$$

This avoids the direct computation of the null space basis $\overline{V}_2$ and works with smaller matrices, especially for small D.

The techniques described above provide a way for a relay node to generate a common secret key for two communication nodes. The precoding techniques discussed above have the advantage that: the signal received at the communication nodes requires minimal processing, only one transmission slot is required for the relay node to communicate information unlike the known amplify-and-forward scheme discussed above where the relay node uses two timeslots, and projecting onto an entry in the codebook improves performance.

Figure 7:
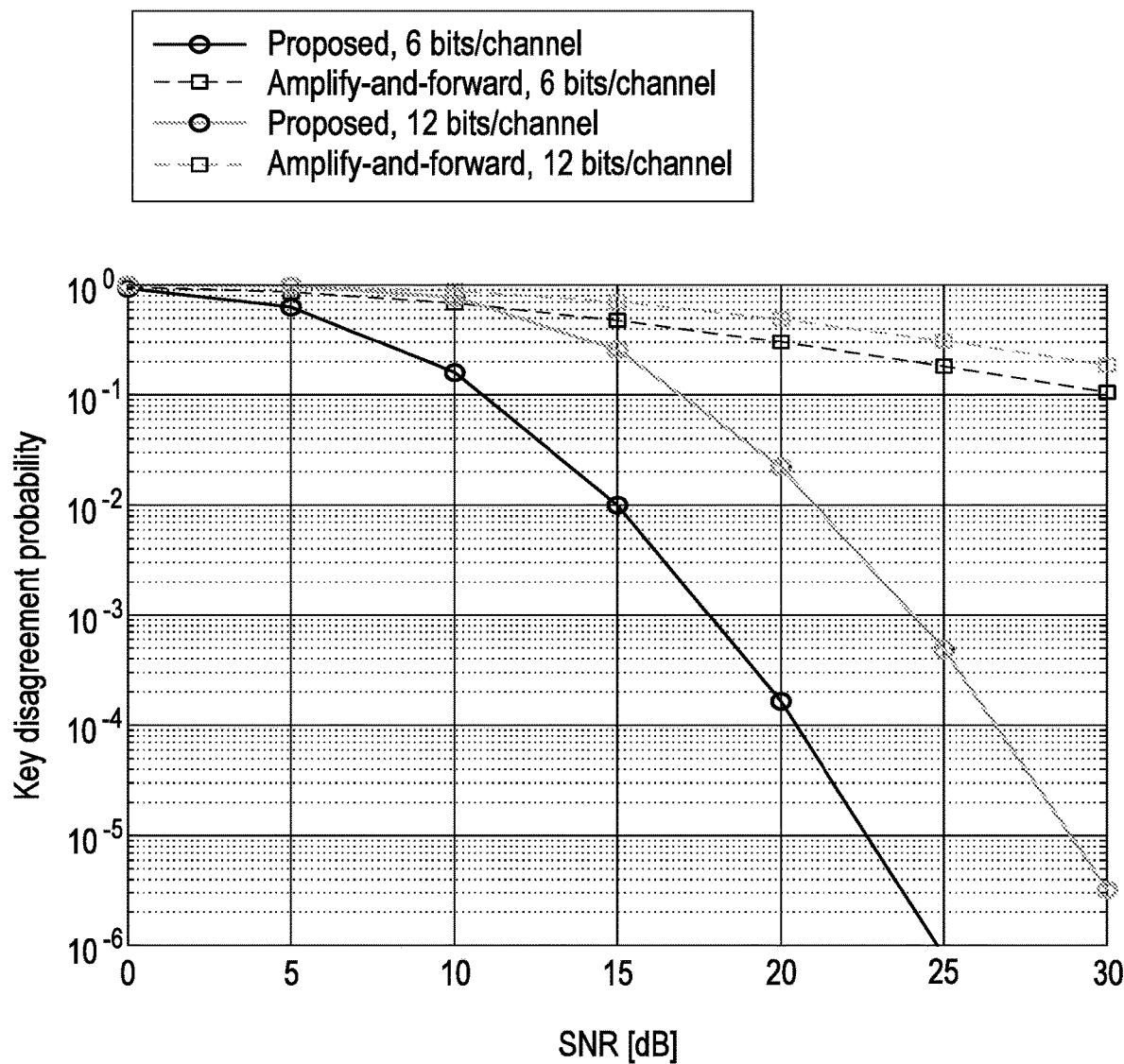
FIG. 7 shows a performance comparison between a method according to an embodiment and a known amplify-and-forward scheme.

FIG. 7 shows a performance comparison between a method according to an embodiment and a known amplify-and-forward scheme.

The proposed scheme was simulated in an OFDM system with N=64 subcarriers. The H and G matrices were formed with D=4 rows, which satisfies D<√(N/2) to guarantee the existence of a nontrivial null space as well as the possibility of choosing an arbitrary codeword q from a common codebook.

For quantising the signal received by the first communication node 101 and the second communication node 102, a vector quantiser with $2^Q$ entries was used which produces a secret key of Q bits. For the avoidance of doubt it is noted that any quantisation scheme can be used by the communication nodes (provided the scheme is the same), since the above method is not dependent on how quantisation is performed.

The above described methods were compared with an amplify-and-forward scheme which also used vector quantisation. As will be noted from the above, in the methods presented herein the input to the quantiser is a vector of size D×1. In contrast, in the amplify-and-forward scheme used for comparison the input vector to the quantiser has size N×1.

In the comparison shown in FIG. 7 a first scrambling sequence, $A_k$, was applied by the first communication node 101 named 'Alice', and a second scrambling sequence, $B_k$, was applied by the second communication node 102 named 'Bob'. Both of the scambling sequences (i.e. $A_k$ and $B_k$) are formed from random 256-QAM symbols.

FIG. 7 shows the key disagreement probability as a function of Signal-to-Noise (SNR) ration. The key disagreement probability is defined as the probability that two communication nodes (i.e. 'Alice' and 'Bob') generate different secret keys, which occurs whenever any of the Q bits of the secret key are different. In particular FIG. 7 shows that that methods described above perform better than the amplify-and-forward scheme when both Q=6 and Q=12 bits are generated for the secret key.

Figure 8:
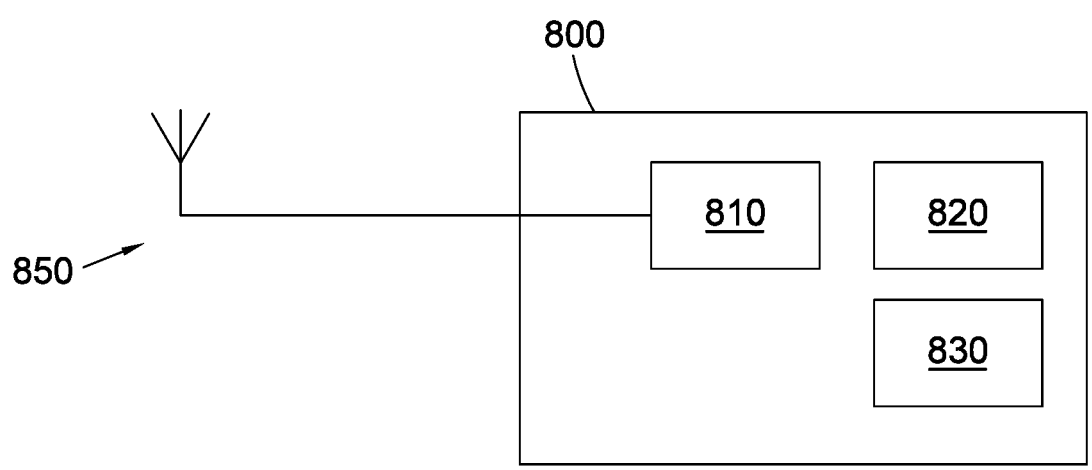
FIG. 8 shows a communication node according to an embodiment.

FIG. 8 shows a communication node according to an embodiment. The communication node 800 comprises an input/output module 810, a processor 820 and a non-volatile memory 830. The input/output module 810 is communicatively connected to an antenna 850. The antenna 850 is configured to receive wireless signals from, and transmit wireless signals to, other communication nodes (including a relay node). The processor 820 is coupled to the input/output module 810 and to the non-volatile memory 830. The non-volatile memory 830 stores computer program instructions that, when executed, cause the processor 820 to execute program steps that implement the functionality of a communication node as described in the above-methods.

Whilst in the embodiment described above the antenna 850 is shown to be situated outside of, but connected to, the communication node 800 it will be appreciated that in other embodiments the antenna 850 forms part of the communication node 800.

In a further embodiment a relay node is implemented as shown in FIG. 8, wherein the non-volatile memory 830 stores computer program instructions that, when executed, cause the processor 820 to execute program steps that implement the functionality of a relay node. In a further embodiment the relay node comprises at least two antennas connected to the input/output module 810.

The above-described methods are used to generate a shared secret key. This secret key is used to encrypt data generated by the communication node before the encrypted data is transmitted to the other communication node. The data may be any source of data including data from actuators or sensors for controlling an industrial process. On receipt of the encrypted data, the communication node uses its secret key to decrypt the encrypted data and obtain the original data.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method comprising:
    transmitting, by a first communication node, a first communication via a first communication channel, an encryption key being generated in a system, the system including the first communication node, a second communication node and a relay node wherein the relay node includes a first antenna, wherein:
    the first communication channel is between the first communication node and the first antenna of the relay node; and
    the first communication includes a first training packet;
    receiving, by the relay node, the first communication; and in response to receiving the first communication, estimating the first communication channel;
    transmitting, by the second communication node, a second communication via a second communication channel wherein:
        the second communication channel is between the second communication node and the first antenna of the relay node; and
        the second communication includes a second training packet;
    receiving, by the relay node, the second communication; and in response to receiving the second communication, estimating the second communication channel;
    generating, by the relay node, a first transmission;
    transmitting, by the relay node, the first transmission signal via the first communication channel and the second communication channel;
    determining, by the first communication node, a first received signal from the first communication channel and the first transmission signal;
    determining, by the second communication node, a second received signal from the second communication channel and the first transmission signal;
    generating, by the first communication node, a first instance of the encryption key based on the first received signal;
    generating, by the second communication node, a second instance of the encryption key based on the second received signal, wherein:
    the first transmission signal is generated based on a setting that the first received signal at an antenna of the first communication node is equal to the second received signal at an antenna of the second communication node.

2. The method according to claim 1, further comprising:
    calculating, by the relay node, a space of a difference between the first communication channel and the second communication channel, all values of elements in the space being lower than a predetermined value; and generating the first transmission signal based on the space.

3. The method according to claim 2, further comprising:
selecting, by the relay node, a codeword from a codebook; and wherein generating the first transmission signal further includes:
   determining a predetermined vector; and
   generating the first transmission signal based on the space and the predetermined vector; wherein:
the predetermined vector is determined such that the first received signal and the second received signal equals the codeword.

4. The method according to claim 1, wherein:
the first communication includes a first training sequence that has been scrambled by a first scrambling sequence;
the second communication includes a second training sequence that has been scrambled by a second scrambling sequence;
and wherein the method further comprises:
   scrambling, by the first communication node, the first received signal with the first scrambling sequence to generate a scrambled first received signal;
   quantising, by the first communication node, the scrambled first received signal to generate the first instance of the encryption key;
   scrambling, by the second communication node, the second received signal with the second scrambling sequence to generate a scrambled second received signal;
   quantising, by the second communication node, the scrambled second received signal to generate the second instance of the encryption key.

5. The method according to claim 1 wherein the first transmission signal is an orthogonal frequency division multiplexing signal including a plurality of subcarriers, wherein the plurality of subcarriers includes a plurality of sets of subcarriers, wherein each set of subcarriers has an equal number of subcarriers and subcarriers in a set convey a same data value.

6. The method according to claim 1 further comprising:
transmitting, by the first communication node, the first communication via a third communication channel;
transmitting, by the second communication node, the second communication via the third communication channel;
determining, by the second communication node, a third received signal in response to the first communication node transmitting the first communication via the third communication channel;
determining, by the first communication node, a fourth received signal in response to the second communication node transmitting the second communication via the third communication channel;
and wherein:
   generating, by the first communication node, the first instance of the encryption key is further based on the fourth received signal; and
   generating, by the second communication node, the second instance of the encryption key is further based on the third received signal.

7. The method according to claim 6 further comprising:
quantising, by the first communication node:
   the first received signal to form a first quantised received signal; and
   the fourth received signal to form a fourth quantised received signal;
quantising, by the second communication node:
   the second received signal to form a second quantised received signal; and
   the third received signal to form a third quantised received signal; and wherein:
   generating the first instance of the encryption key further includes a modulo-2 addition of the first quantised received signal and the fourth quantised received signal; and
   generating the second instance of the encryption key further includes a modulo-2 addition of the second quantised received signal and the third quantised received signal.

8. The method according to claim 6, further comprising:
concatenating, by the first communication node, the first received signal and the fourth received signal to form a first concatenated signal;
concatenating, by the second communication node, the second received signal and the third received signal to form a second concatenated signal;
quantising, by the first communication node, the first concatenated signal to form a first quantised concatenated signal;
quantising, by the second communication node, the second concatenated signal to form a second quantised concatenated signal;
generating, by the first communication node, the first instance of the encryption key based on the first quantised concatenated signal; and
generating, by the second communication node, the second instance of the encryption key based on the second quantised concatenated signal.

9. The method according to claim 1 wherein the relay node includes a second antenna, and wherein the method further comprises:
transmitting, by the first communication node, the first communication via a third communication channel between the first communication node and the second antenna of the relay node;
receiving, by the relay node, the first communication; and in response to receiving the first communication, estimating the third communication channel;
transmitting, by the second communication node, the second communication via a fourth communication channel between the second communication node and the second antenna of the relay node;
receiving, by the relay node, the second communication;
in response to receiving the second communication, estimating the fourth communication channel;
generating a second transmission signal;
transmitting the second transmission signal via the third communication channel and the fourth communication channel;
wherein:
   the second transmission signal is generated such that the combination of the first transmission signal transmitted via the first communication path and the second transmission signal transmitted via the third communication path equals the combination of the first transmission signal transmitted via the second communication path and the second transmission signal transmitted via the fourth communication path.

10. A system comprising a first communication node, a second communication node and a relay node wherein an encryption key is generated in the system, and the relay node includes a first antenna, wherein:

the first communication node is configured to:
  transmit a first communication via a first communication channel, wherein:
    the first communication channel is between the first communication node and the first antenna of the relay node; and
    the first communication includes a first training packet;
  determine a first received signal from the first communication channel and a first transmission signal; and
  generate a first instance of the encryption key based on the first received signal;
the second communication node is configured to:
  transmit a second communication via a second communication channel wherein:
    the second communication channel is between the second communication node and the first antenna of the relay node; and
    the second communication includes a second training packet;
  determine a second received signal from the second communication channel and the first transmission signal;
  generate a second instance of the encryption key based on the second received signal; and
the relay node is configured to:
  receive the first communication; and in response to receiving the first communication, estimate the first communication channel;
  receive the second communication; and in response to receiving the second communication, estimate the second communication channel;
  generate the first transmission signal based on a setting that the first communication channel is equal to the second communication channel within a predetermined range; and
  transmit the first transmission signal via the first communication channel and the second communication channel; wherein:
the first transmission signal is generated based on a setting that the first received signal at an antenna of the first communication node is equal to the second received signal at an antenna of the second communication node.

11. The system according to claim 10, wherein the relay node is further configured to:
  calculate, a space of a difference between the first communication channel and the second communication channel, all values of elements in the space being lower than a predetermined value; and
  generate the first transmission signal based on the space.

12. The system according to claim 11 wherein the relay node is further configured to:
  select a codeword from a codebook;
  determine a predetermined vector; and
  generate the first transmission signal based on the space and the predetermined vector; wherein:
  the predetermined vector is determined such that the first received signal and the second received signal equals the codeword.

13. The system according to claim 10, wherein:
  the first communication includes a first training sequence that has been scrambled by a first scrambling sequence;
  the second communication includes a second training sequence that has been scrambled by a second scrambling sequence;

and wherein:
  the first communication node is further configured to:
    scramble the first received signal with the first scrambling sequence to generate a scrambled first received signal; and
    quantise the scrambled first received signal to generate the first instance of the encryption key; and
  the second communication node is further configured to:
    scramble the second received signal with the second scrambling sequence to generate a scrambled second received signal;
    quantise the scrambled second received signal to generate the second instance of the encryption key.

14. The system according to claim 10 wherein the first transmission signal is an orthogonal frequency division multiplexing signal including a plurality of subcarriers, wherein the plurality of subcarriers includes a plurality of sets of subcarriers, wherein each set of subcarriers has an equal number of subcarriers and subcarriers in a set convey a same data value.

15. The system according to claim 10, wherein:
  the first communication node is further configured to:
    transmit the first communication via a third communication channel;
    determine a fourth received signal in response to the second communication node transmitting the second communication via the third communication channel;
    generate the first instance of the encryption key based on the fourth received signal and the first received signal; and
  the second communication node is further configured to:
    transmit the second communication via the third communication channel;
    determine a third received signal in response to the first communication node transmitting the first communication via the third communication channel; and
    generate the second instance of the encryption key based on the third received signal and the second received signal.

16. The system according to claim 15 wherein:
  the first communication node is further configured to:
    quantise the first received signal to form a first quantised received signal;
    quantise the fourth received signal to form a fourth quantised received signal; and
    generate the first instance of the encryption key according to a modulo-2 addition of the first quantised received signal and the fourth quantised received signal; and
  the second communication node is further configured to:
    quantise the second received signal to form a second quantised received signal;
    quantise the third received signal to form a third quantised received signal; and
    generate the second instance of the encryption key according to a modulo-2 addition of the second quantised received signal and the third quantised received signal.

17. The system according to claim 15 wherein:
  the first communication node is further configured to:
    concatenate the first received signal and the fourth received signal to form a first concatenated signal;
    quantise the first concatenated signal to form a first quantised concatenated signal; and generate the first instance of the encryption key based on the first quantised concatenated signal; and the second communication node is further configured to:
concatenate the second received signal and the third received signal to form a second concatenated signal; and quantise the second concatenated signal to form a second quantised concatenated signal;

generate the second instance of the encryption key based on the second quantised concatenated signal.

18. The system according to claim 10 wherein the relay node includes a second antenna, and wherein:
the first communication node is further configured to:
transmit the first communication via a third communication channel between the first communication node and the second antenna of the relay node;
the second communication node is further configured to:
transmit the second communication via a fourth communication channel between the second communication node and the second antenna of the relay node; and
the relay node is further configured to:
receive the first communication; and in response to receiving the first communication, estimate the third communication channel;
receive the second communication; and in response to receiving the second communication, estimate the fourth communication channel;
generate a second transmission signal;
transmit the second transmission signal via the third communication channel and the fourth communication channel;
wherein:
the second transmission signal is generated such that the combination of the first transmission signal transmitted via the first communication path and the second transmission signal transmitted via the third communication path equals the combination of the first transmission signal transmitted via the second communication path and the second transmission signal transmitted via the fourth communication path.

19. An apparatus comprising a first antenna and a processor, wherein the processor is configured to:
receive a first communication including a first training packet; and
in response to receiving the first communication, estimate a first communication channel between the first antenna of the apparatus and a transmitter of the first communication;
receive a second communication including a second training packet; and
in response to receiving the second communication, estimate a second communication channel between the first antenna of the apparatus and a transmitter of the second communication;
generate a first transmission; and
transmit the first transmission signal via the first communication channel and the second communication channel; wherein:
the first transmission signal is generated based on a setting that a first received signal received by an antenna of the transmitter of the first communication is equal to a second received signal received by an antenna of the transmitter of the second communication.

20. The apparatus according to claim 19, wherein the processor is further configured to:
calculate, a space of a difference between the first communication channel and the second communication channel, all values of elements in the space being lower than a predetermined value; and
generate the first transmission signal based on the space.

* * * * *